United States Patent Office 3,632,705
Patented Jan. 4, 1972

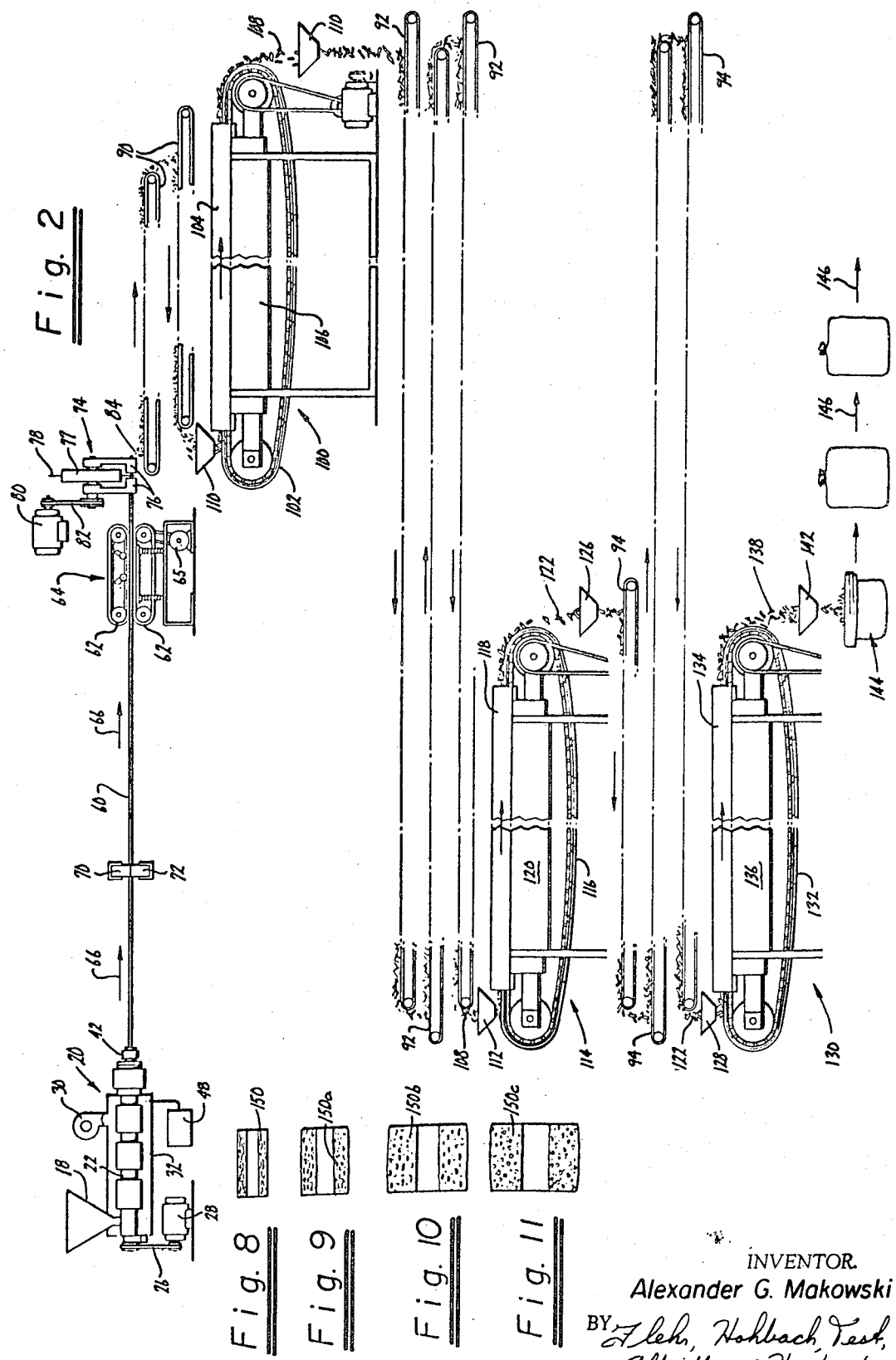

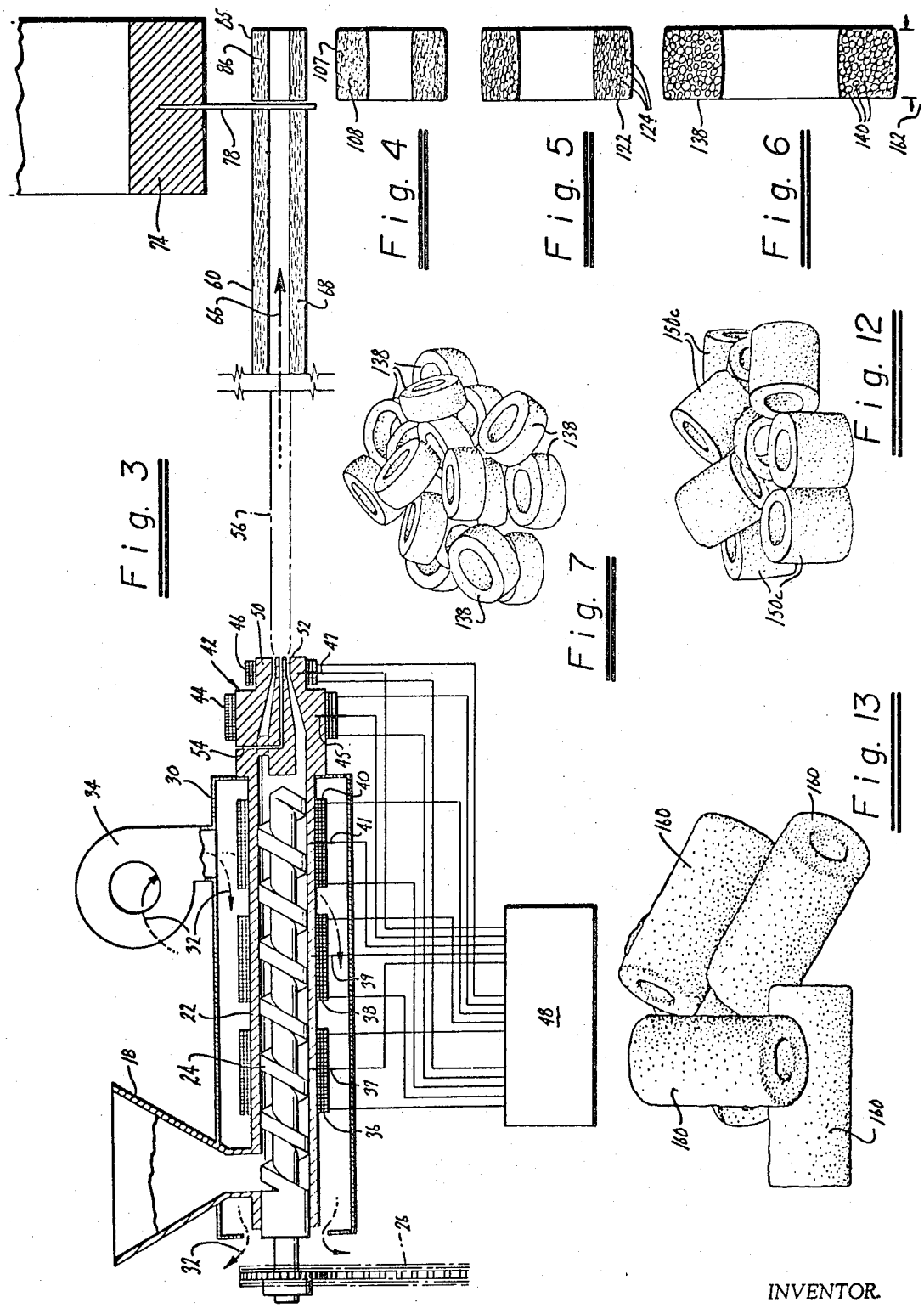

3,632,705
METHOD FOR MANUFACTURING FREE FLOW PACKING MATERIALS OF LOW BULK DENSITY
Alexander G. Makowski, Wilmington, Del., assignor to Free-Flow Packaging Corporation, Redwood City, Calif.
Continuation-in-part of abandoned application Ser. No. 765,083, Oct. 4, 1968. This application June 4, 1970, Ser. No. 43,527
Int. Cl. B29d 23/04, 27/02
U.S. Cl. 264—51                  13 Claims

ABSTRACT OF THE DISCLOSURE

A method for the manufacture of free-flow packing materials in the form of relatively stiff crushable cylinders of foamed expanded plastic involving the heating and extruding of the plastic to form hollow cylindrical tubes of foamed plastic simultaneously with pulling on the extruded tubes to elongate the same and to longitudinally orient the void spaces and gas pockets in the walls of the tube, cutting the extruded elongate tubes to form individual cylinders, and thereafter heating and gradually expanding the individual cylindrical units to achieve a substantially greater expansion of the tube walls in a radial direction than in a longitudinal direction, as respects the axis of the cylinders. The expansion may be carried out in successive stages.

CROSS-REFERENCE TO RELATED APPLICATIONS

This application is a continuation-in-part of my copending United States application Ser. No. 765,083 filed on Oct. 4, 1968 and now abandoned.

BACKGROUND OF THE INVENTION

This invention relates generally to the manufacture of free-flow packing materials of low bulk density, and more particularly to methods and means for manufacturing free-flow packing materials in the form of relatively stiff but crushable cylinders of foamed expanded plastic material.

Extruded loose fill packaging materials of plastic or foamed plastic are known in the art, for example as disclosed in U.S. Pats. 3,047,136, 3,074,543, 3,066,382 and 3,251,728. As generally disclosed in these patents, various resinous or plastic materials are extruded in desired shapes and cut for use as packing materials. Stanley Pat. 3,074,543 particularly discloses a form of hollow plastic cylinder which has proved to be highly effective for such use because of its "free-flow" characteristics. The tangled masses of expanded plastic foam disclosed in Pats. 3,066,382 and 3,251,728 have also proved advantageous for such use because of their low bulk densities. Heretofore, however, no successful way of combining the advantageous shapes and structures of these prior patents has been devised so that a satisfactory method of doing so is highly to be desired.

SUMMARY OF INVENTION AND OBJECTS

Generally stated, the present invention is directed to a method and means for the continuous manufacture of free-flow packing units in the form of substantially hollow shape-retaining crushable tubes or cylinders, made of foamed expanded plastic. The method generally involves the successive steps of heating an expandable plastic material to a plastic or heat-softened state, continuously extruding the heat-softened plastic material in the form of a hollow tube, simultaneously applying forces to longitudinally stretch the extruded material, continuously cooling and cutting the extruded tube into individual units, subjecting the individual units to the expanding action of atmospheric steam or other gas at elevated temperature to expand longitudinally stretched gas cells within the walls of the individual units, holding the expanded units for a period to allow equalization of internal gas pressures with ambient pressure, and repeating the expanding and holding steps as necessary to obtain a desired radial expansion of the individual units.

It is an object of the present invention, therefore, to provide a method for the continuous manufacture of free-flow packing materials in the form of relatively stiff, hollow crushable cylinders, made of the foamed expanded plastic.

Another object of the invention is to provide a novel procedure for extruding foamed expanded plastic materials to continuously form substantially hollow, self-supporting but crushable cylinders.

Another object of the invention is to provide a novel procedure for forming foamed expanded cylindrical units wherein the foam structure is initially stretched along the axis of the cylinder and subsequently expanded outwardly to obtain desired open hollow substantially shape-retaining cylindrical shapes.

Still another object of the invention is to provide a method for making cylindrical packing units of such character which is readily adapted to machine-type production-line techniques.

A further object of the invention is to provide a novel method for the manufacture of foamed expanded, free-flow packing materials of the type described which makes possible the rapid low cost production of packing units of superior quality.

Additional objects and advantages of the present invention will appear from the following description in which preferred embodiments have been set forth in detail in conjunction with the accompanying drawing.

BRIEF DESCRIPTION OF THE DRAWING

FIG. 2 is a schematic representation of a system of apparatus which may be used in carrying out the method of the present invention.

FIG. 3 is an enlarged schematic representation of a portion of the apparatus of FIG. 2, illustrating one stage in the formation of a particular embodiment of a hollow substantially cylindrical packing unit by the method of the present invention.

FIGS. 4, 5 and 6 are sectional views showing further stages in the formation of the packing units produced as in FIG. 3.

FIG. 7 is a perspective view of a quantity of packing units, produced by the sequence of processing represented in FIGS. 3 through 6.

FIGS. 8 through 11 are views similar to FIGS. 3 through 6, showing a further embodiment of a hollow substantially cylindrical packing unit, as produced by the method of the present invention.

FIG. 12 is a perspective view like FIG. 7 showing a quantity of packing units, produced by the sequence of processing represented by FIGS. 8 through 11.

FIG. 13 is a view like FIGS. 7 and 12 showing a further embodiment of a hollow substantially cylindrical packing unit, as produced by the method of the present invention.

DESCRIPTION OF THE PREFERRED EMBODIMENTS

Figure 1:
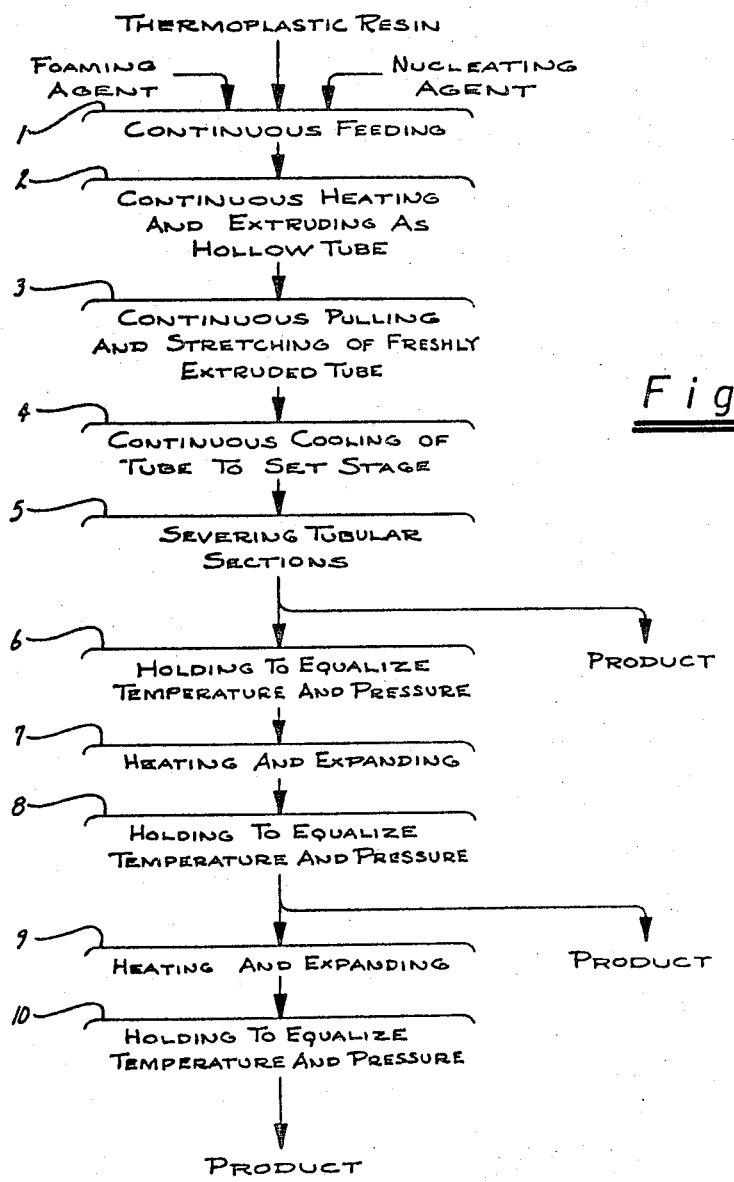
FIG. 1 is a flow sheet illustrating the method of manufacturing hollow, substantially cylindrical free-flow packing materials of foamed expanded plastic, in accordance with the present invention.

Referring to the drawings, FIG. 1 represents a general flow sheet illustrating the main steps in the method of the present invention.

In step 1 a thermoplastic resin (in either modified or unmodified form) is continuously fed to the system together with suitable foaming and nucleating agents. Thermoplastic resins and agents capable of producing the foamed, expanded hollow cylindrical packing units of the present invention includes the alkenyl aromatic polymers and agents generally disclosed in U.S. Pat. 3,066,382 and the aliphatic olefin polymers and agents generally disclosed in Pat. 3,251,728.

In step 2 the extrusion mass comprising the resin together with forming and nucleating agents is continuously heated and extruded in the form of an elongate hollow tube. As noted below, this step is necessarily carried out simultaneously with longitudinal stretching of the freshly extruded material as carried out in steps 3 and 4.

In step 3, the continuously extruded hollow tube is pulled and stretched to longitudinally orient the void spaces and gas pockets (hereinafter referred to as "cells") formed in the walls of the tube as it is extruded.

In step 4, the extruded tube is continuously cooled in the ambient atmosphere to a set stage, the cooling and setting of the tube allowing the frictional engagement to effect the desired stretching and longitudinal orientation of the gas cells in the step 3.

In step 5, the cooled hardened tube is continuously severed to form relatively short, partially expanded cylindrical sections. These short sections are characterized by a longitudinally stretched, foamed cellular structure which possesses a latent capacity for expansion to achieve the low bulk density desired in loose-fill packaging materials. These units severed in step 5 can be processed and expanded for use as a packaging material, as in steps 6 to 8 or 10, or, alternatively, they can be shipped as a product to the point of use where they may be similarly processed. In either case, the severed units are heated and expanded in step 7 (e.g., by exposure to atmospheric steam) to achieve a radial expansion of the units to the desired open hollow, expanded configuration. As noted previously, radial expansion is greatly increased by the stretched or longitudinal orientation of the cells formed during the extrusion of the tubular units.

In step 8, the expanded units are held at ambient conditions to gradually equalize internal temperatures and pressures within the cells with those of the ambient atmosphere. The resulting cooled expanded units are highly effective as packing materials and may be separated at this stage in the processing for such use as an end product.

If desired, the expanded units can be again heated to a molten or heat-softened state, in step 9. This further heating again softens the walls of the cells contained within the cylindrical sections and again expands the gases within the cells to stretch the cell walls and the tubular sections primarily in a radial direction. The twice expanded units are again held in step 10 to equalize the gas pressures and temperatures within the cells with those of the ambient atmosphere. The processing of steps 9 and 10 can be repeated as often as necessary to effect a reduction in the foam and/or bulk density, as may be desired for the final product utilized as a packing material.

In carrying out the manufacturing procedures of the present invention, it is possible to employ various foamable, thermoplastic polymers, including any of the resinous alkenyl aromatic polymers or aliphatic olefin polymers disclosed in U.S. Pats. 3,066,382 or 3,251,728, or resins of similar characteristics. As noted, these resins are customarily employed in conjunction with volatile organic foaming or expanding agents which are uniformly distributed throughout the polymers. To achieve a desired foam structure characterised by an essentially cellular structure (unicellular or interconnecting) it is also desirable that the polymer incorporate or be intermixed with a suitable nucleating agent. Although the proportion of foaming and nucleating agents will vary somewhat with the particular resinous material employed, the proportions should be such that the plastic in a foamed expanded state will possess a desired cellular structure having a desired proportion of void spaces with respect to total volume. Specifically, the formulation of the thermoplastic materials should be very carefully controlled to provide foamed expanded plastic having desired essential characteristics after the initial extrusion and expansion, for example cell sizes within the range from about 0.001 to 0.1 inch, void spaces ranging from at least 25% to no more than 85% of the total extruded volume and an initial foam density within the range from about 1 to no more than 12 pounds per cubic foot. When cooled to ambient temperatures, the extruded foam should also possess sufficient internal strength to retain the characteristics of a rigid foam during normal handling, but be capable of expansion upon being heated to achieve foam densities preferably below about 1 pound per cubic foot and within the range from about 0.3 to 1.5 pounds per cubic foot. As is herein after noted, the ability of the plastic foams processed in accordance with the present invention to achieve the desired foam structures and densities is dependent upon the ability of the foam structures to accommodate the longitudinal stretching and orientation of the cells within the foams during the initial or extrusion stage of formation of the foams.

Alkenyl aromatic polymers useful as the thermoplastic resins herein generally comprise, in chemically combined form, at least about 70 percent by weight of at least one alkenyl aromatic compound having the general formula:

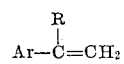

wherein Ar represents an aromatic hydrocarbon of the beneze series, and R is hydrogen or the methyl radical. Examples of such alkenyl aromatic polymers are homopolymers of styrene, alpha-methyl styrene, ortho-, meta-, and para-methyl styrene, ar-ethylstyrene, and ar-chlorostyrene; the copolymers of two or more of such alkenyl aromatic compounds with one another; and copolymers of one or more of such alkenyl aromatic compounds with minor amounts of other readily polymerizable olefinic compounds such as divinylbenzene, methylmethacrylate, or acrylonitrile, etc.

With thermoplastic resins of the above type e.g., foamable and expandable polystyrene), the usual practice is to incorporate a foaming agent as a uniform dispersion distributed throughout the resin. Typical foaming agents which may be employed for this purpose are known in the art, for example, as disclosed in U.S. Pats. 2,941,964, 2,983,692, and 3,344,215 and also in H. R. Lasman, "Foaming Agents," Modern Plastics Encyclopedia 381 (1968–1969). Suitable foaming agents include low boiling aliphatic hydrocarbons such as pentane, hexane, heptane, and butanes; low boiling halohydrocarbons, e.g. fluorinated hydrocarbons sold under the trademark "Freon" by E. I. du Pont de Nemours, Wilmington, Del., carbon tetrachloride, chloromethanes, -ethanes, -propanes and and -butanes; low boiling petroleum ethers; inert gases such as carbon dioxide, and other gases hereinafter noted; and mixture of the above. These foaming agents are incorporated within the thermoplastic polymer or resinous material.

Foam structures according to the present invention should have a thermoplastic cellular character capable of being heated and expanded to achieve a desired low foam density and in the cooled rigid state should possess a desired characteristic of crushability. To insure the obtaining of foam structures of desired characteristics, nucleating agents are preferably employed. In the case of the alkenyl aromatic polymers (e.g., polystyrene) many conventional nucleating agents are known as disclosed, for example, in U.S. Patents 3,344,215 and in Naturman, L. I., "How to Select Blowing Agents for Thermoplastics," Plastics Technology 43 (October 1969). Such nucleating agents include combinations of an acid, suitably organic acids such as malonic, citric, phthalic, and fumaric acid, with carbon dioxide-liberating compounds such as sodium and potassium bicarbonate. Combinations such as sodium citrate and sodium bicarbonate are also suitable for use. Other suitable nuclation agents functioning like "boiling chips" include finely divided resin, barium sulfate lithopane, clay, talc, diatomaceous earth and pigments are disclosed in the Naturman article. Still further nucleating agents which may be used are combinations of nitrogen liberating compounds with finely divided solids as disclosed in Patent 3,344,215. The aforementioned nucleating agents are incorporated with the extrusion material in a desired proportion, for example by gravity feed into the hopper for extrusion apparatus, or by tumbling with beads or pellets of solid polymer feed. The nucleating agents generally perform the function of insuring a uniform distribution of cells during the initial extrusion processing to purodoce a foamed plastic.

In general the foaming and nucleating agents are present in amounts sufficient to provide a cellular foam which will be rigid on cooling to the set stage but which will have a desired characteristic of crushability. In practice the proportion of these agents will vary somewhat with the particular resin employed. In the case of a polystyrene resin employing a dispersed pentane or dichlorodifluromethane expanding agent, the expanding agent may range from about 5 to 15% by weight of the extrusion mixture. The proportion of sodium citrate and sodium bicarbonate as nucleating agent may range from 1 to about 4% of the extrusion mixture, with the sodium citrate comprising about ½ to 1% and soduim bicarbonate about 1 to 3% of the total. Other agents may also be employed to obtain a uniform dispersion of these agents. For example, a small amount of a cooking oil may be used as a wetting agent to achieve a uniform coating of plastic pellets with sodium bicarbonate.

When aliphatic olefin polymers are used in making the free-flow packing units of the present invention, such polymers are normally solid polymers. Satisfactory polymers may be obtained by polymerizing at least one alpha-mono-olefinic aliphatic hydrocarbon containing from 2 to 8 carbon atoms, such as ethylene, propylene, butene-1, pentene-1, 3-methylbutene-1, 4-methylpentene-1, 4-methylhexene-1, or 5-methyhexene-1, alone, with one another, or with various other polymerizable compounds. Foamed expanded polymers of ethylene or propylene alone are highly satisfactory and produce desired foam structures which are chemically inert. Polymerizable organic compounds which can be polymerized with ethylene or propylene include vinyl acetate, $C_1$–$C_4$ alkyl acrylates such as ethyl acrylate, styrene, lower alkyl esters or methacrylic acid such as methyl methacrylate, tetrafluoroethylene and acrylonitrile.

The expanding or foaming agents employed with the aliphatic olefin polymers may be selected from a wide group of normally gaseous or volatile liquids. Indicated expanding and foaming agents include nitrogen, argon, neon, helium, acetylene, ammonia, butadiene, carbon dioxide, cyclopropane, dimethylamine, 2,2-dimethylpropane, ethane, ethylamine, ethylene, isobutane, isobutylene, monomethylamine, propane, pentane, propylene, and trimethylamine, certain of the halogen derivatives of methane and ethane, such as chlorodifluoromethane, dichlorodifluoromethane, dichlorofluoromethane, trichlorofluoromethane, difluorotetrachloroethane, difluorochloroethane, 1,1-difluoroethane, trichlorofluoromethane, and particularly 1,1-dichlorotetrafluoroethane and 1,2-dichlorotetrafluoroethane.

The dichlorotetrafluoroethanes have been found to be particularly effective as foaming agents for making foamed bodies from normally solid aliphatic olefin polymers when employed in accordance with the present invention in amounts to about 0.2 to 1.0% by weight of the aliphatic olefin polymers. Again the precise amount of expanding or foaming agent employed will depend in large measure on the particular aliphatic olefin polymer used in the extrusion process. In general, among the aliphatic olefin polymers, foamed expanded polyethylene and polypropylene resins based on initial resins of molecular weight 250 to 400,000 are to be preferred.

FIG. 2 illustrates a system of apparatus suitable for continuously carrying out the method of the present invention as generally outlined in FIG. 1. The thermoplastic resin is added together with foaming and nucleating agents to the hopper 18 of the extrusion apparatus 20. As illustrated in FIG. 2, and more specifically in FIG. 3, the extrusion apparatus can be more or less conventional in design, making use of a jacketed cylinder 22 and the feedscrew 24 operated through drive train 26 by the motor 28. The jacket 30 permits the circulation of cooling gases (arrows 32), upon operation of the blower 34. The extrusion mixture is gravity fed from the hopper 18 into the barrel of the extrusion chamber 22 where it is heated to a molten or heat-softened state by a series of heating units 36, 38 and 40 arranged along the length of the extrusion cylinder. The heating units, which may be individually controlled by the thermostats 37, 39 and 41, respectively, heat the extrusion mass to a molten or substantially fluid state so that it may be fed by the screw 24 into the confines of the extrusion head 42. The extrusion head is also provided with heating units 44 and 46 (controlled by the thermostats 45 and 47) for the head adapter and nozzle of the extrusion head. An appropriate heat controller responsive to the thermostats for each of the heating units is provided at 48. In general, the extrusion apparatus 20 functions to heat and mix the heat-softenable resinous feed to a molten state, and to extrude the same through the narrow passage between a female die 50 and central pin 52 of the extrusion head in the form of a hollow tube of foamed expanded plastic. The pin 52 is suitably provided with a vent 54 to equalize the internal pressure within the extruded tube with that of the ambient external atmosphere, to thereby prevent inward collapse of the extruded tube.

Within the extrusion chamber 22, the extrusion mass is quickly heated to a semisolid or molten state by the heaters 36 and 38 which are maintained in the range from about 280 to 320° F. The desired molten or heat-softened state of the feed is maintained by the heaters 40, 44 and 46 which preferably are at a slightly lower temperature, within the range from about 215 to 230° F. As the softened plastic material leaves the extrusion die, the evolved gases from the foaming agents (which have been kept under pressure within the extrusion barrel) expand and form cells about nuclei formed by the nucleating agents. The extrusion mass forced out the circular opening between the male and female members 52, 50 forms a hollow substantially cylindrical tube which immediately expands to a diameter larger than the orifice dimensions, as indicated by the dotted lines 56 in FIG. 3. As the extruded hollow tube passes into the atmosphere surrounding the extrusion apparatus, it quickly cools to a set stage to form an elongate substantially self-supporting tube. As particularly illustrated in FIG. 2, the elongate tube (represented at 60) is frictionally engaged by endless belts or other friction devices 62 forming part of a pulling mechanism 64. The latter functions to continuously pull the extruded tube away from the extrusion apparatus (arrow 66) at a rate appreciably faster than the heat-softened plastic material is extruded through the extrusion head. The net effect is to longitudinally stretch the heat-softened material issuing from the extrusion nozzle to longitudinally orient the cells (represented at 68 in FIG. 3) produced by the foaming agents in the extrusion processing.

During the extension operation, the extruded hollow tube may also be engaged by a suitable anti-static device 70, for purposes of eliminating or substantially reducing static electricity while simultaneously lubricating and cooling the extruded tube. By way of illustration, the anti-static device 70 may be a slotted foam rubber sponge immersed in a container filled with an anti-static agent (e.g., an aqueous solution of detergent or other surfactant liquid). The anti-static agent applied to the surface of the freshly extruded material, while still hot, is absorbed into the exterior surfaces and combines with the foamed plastic material as an outer surface layer. The anti-static characteristic of the material therefore becomes permanent in the sense that the anti-static agent cannot be rubbed off in the manner of conventional anti-static applications.

In carrying out the invention, any suitable pulling device 64 may be employed to frictionally engage and pull the tube from the extrusion head. By way of illustration, highly satisfactory results are obtained with a conveying apparatus of the type disclosed in U.S. Pat. 3,170,564, when the variable speed drive 65 for the conveyors is adjusted to operate at a linear speed approximately 5 to 55 times the lineal speed of extrusion. Thus assuming an average lineal rate of extrusion of approximately 5 feet per minute, the pulling device 64 would operate at a lineal belt speed within the range from about 25 to 280 feet per minute. Such ratio of pulling speed to extrusion speed has been found to produce the essential stretching and longitudinal elongation of the cells within the walls of the hollow extruded tube 60. Higher pulling rates and speeds will eventually reach the breaking point of the extruded material, whereas lower pulling rates and speeds not only reduce the capacity for radial expansion, but also may result in a production rate below that normally desired. Consequently, for practical purposes a pulling ratio of at least 5:1 is normally employed, and a ratio of at least 10:1 is preferred.

The cooled, hardened, cylindrical tube 60 is fed by the pulling device 64 into a suitable cutter 74 which may be of the rotary type. By way of illustration, the tube may be fed through hollow bushings or bearings 76 mounted on either side of a flywheel 77 carrying circumferentially spaced cutter blades 78. The cutter may be powered by a suitable motor 80 through the take-off 82. In the continuous processing, feeding of the tube 60 continuously through the bearings 76 causes individual cylindrical units severed from the tube to be forced endwise from the cutting device for removal as an end product, as generally represented at 84 in FIG. 2.

It will be appreciated that the operations just described correspond to the steps 1 through 5 in the processing outlined in FIG. 1, the product shown at 84 corresponding to the product obtained at step 5. The particular product is illustrated at 85 in FIG. 3, and comprises a short hollow cylindrical section of foamed expanded plastic in which the individual cells 86 are longitudinally oriented with respect to the axes of the tubular sections. As will hereinafter be explained, this structural arrangement of the cells provides an expansion capability which is substantially greater in a radial direction than along the axes of the individual tubular units. In fact, as noted hereafter, subsequent expansion of the hollow cylindrical units, the units actually tend to shrink in longitudinal dimension as they expand radially.

As noted previously, it is an important feature of the present invention that the processing produce individual packing units from a foamed expanded plastic in a free-flow cylindrical form. It is also highly desirable that a quantity of such units produced as an end product, have a relatively low bulk density, based on a relatively low foam density of the individual units.

In terms of the process just described, the orifice of the extrusion diet 42 should have relatively small dimensions in terms of the final product. Thus, a typical extrusion die to produce the cylindrical units 85 may have a female die 50 with an internal diameter of the order of 0.100 inch whereas the male die member 52 may have an outer diameter of the order of 0.060 inch. As the heat-softened plastic material passes from the extrusion die, it expands to a diameter substantially larger than that of the orifice dimensions, for example to an outer diameter of approximately 0.25 inch and an inner diameter of approximately 0.125 inch. This degree of expansion is caused by the action of the foaming agents combined with that of the nucleating agents. As the extruded tube moves into the surrounding atmosphere, it is immediately stretched and then subjected to cooling by the ambient temperature, with additional evaporative cooling resulting from passage of the tube through the anti-static device 70. Such cooling naturally causes the gas within the cells 68 of the tube walls to contract, thus leaving a partial vacuum within the individual cells which generally causes a slight shrinkage of the cells. The foamed structure forming the cell walls is strong enough to support this vacuum in the absence of further heating and expansion. However, before further expansions of the packing material can be carried out, it is necessary that the extruded material be held or "aged" at ambient conditions for a sufficient period of time, usually about four to eight hours to let the air permeate through the cell walls to equalize inside and outside temperatures and pressures.

Referring to FIG. 2, the initial aging or holding of the severed units 85 is accomplished by placing in storage bins (not shown) or by means of appropriate vapor permeable conveyers 90 in the form of endless belts. These conveyers are arranged in length and number to insure that the outside air penetrates into the cells of the expanded material to achieve the desired equalization of the inside and outside temperature and pressures. It will be appreciated that some cooling and equalization will have taken place by the time the extruded tube reaches the cutter 74, due to the circulation of the ambient air and the evaporative cooling at the anti-static device 70. Following the further cooling and aging on the conveyers 90, the cooled equalized units 85 can be fed to a first expansion unit, represented at 100 in FIG. 2.

Within the expansion unit 100, the severed cylindrical units are heated to a shape-retaining but heat-softened state, causing the equalizing gases and intermixed air within the cells 108 of the tube walls to expand and stretch the surrounding plastic material, enlarging the cells. By virtue of the longitudinal orientation of the individual cells, substantial expansion occurs in a radial direction as is specifically apparent from a comparison of the units 107 in FIG. 4 with the units 85 in FIG. 3. More specifically, within the longitudinally oriented gas cells, the pressure of the expanding gases is applied to a greater extent on surface areas tending to promote radial expansion rather than longitudinal expansion, resulting in some cases in a slight shrinkage of the cells upon actual expansion. Because of this expansion potential built into the structure of the elongated cells, care must be taken to avoid excessive expansion which would result in collapse of the tube wall. Thus, too much heat applied to the cell walls will necessarily stretch the cells walls to such extent that the surrounding heat-softenable plastic structure will be unable to support the ensuing vacuum within the cells. Accordingly, in practice, it has been found preferable to initially expand the extruded tubes in the presence of atmospheric steam (212° F.) for a relatively short period of about 20 to 60 seconds, to insure against collapse of the product or the production of undersized, wrinkled tubes.

As illustrated in FIG. 2, the expansion unit 100 may comprise an endless perforated conveyor 102 which passes through an expansion tunnel 104, suitably positioned above a steam chamber 106. The cooled cylindrical units falling through the funnel 110 pass through the tunnel 104 for a period of time determined by the belt speed, during which time they are subjected to action of steam at atmospheric pressure rising from the steam chamber 106. The resulting expanded tubes, designated 107 in FIG. 4, fall through a funnel or collection device 110 into storage bins (not shown) or onto a further system of conveyers 92. The conveyers 92 again achieve a holding and progressive cooling of the expanded tubes 107 to effect equalization of gas temperatures and pressures within the cells 108 by penetration of air from the outside. After a further holding period of from four to eight hours, the cooled equalized tubes 107 pass through a collection device 112 for a second expansion device 114. This device can be similar in construction to the expansion unit 100, employing a similar perforated conveyor 116, expansion tunnel 118 and interconnecting steam chamber 120. The function of the expansion unit 114 is to again expand the severed cylindrical units as specifically represented by the unit 122 in FIG. 5. At this stage of expansion the individual gas cells 124 can approach or equal the ovoid cellular structure of conventional plastic foams.

Following the second stage expansion, the units 122 are fed through a collection device 126 to a further system of conveyors 94 to again effect equalization of the temperatures and pressures within the expanded gas cells 124 by holding or aging the units for a period ranging from about four to eight hours. Thereafter the equalized units 122 can be fed through the collection device 128 to a still further heating and expansion unit 130. This device may employ a perforated endless conveyer 132, expansion tunnel 134 and steam chamber 136, functioning as before to heat and expand the units 122 to achieve a further expanded state, as represented by the unit 138 in FIG. 6. As shown in this figure, the cells 140 may fully obtain the ovular or spherical shape typical of foamed expanded plastic. The units 138 can now be fed through a collection device 142 to suitable containers 144 for further aging and shipment to the consumer. The described filling operation may again be continuous, as represented by the arrows 146.

FIG. 7 illustrates a quantity of the foamed expanded plastic units 138 in a preferred ring or "lifesaver" form. A packing mass of units in this form has been found to be highly effective in the packaging of fragile goods for shipment or storage. Specifically, they not only possess the desired free-flow characteristics, but also resist migration of a packed item during the repeated handling and vibration of prolonged shipment to an unusually high degree.

Although the packing unit illustrated in FIG. 7 is to be preferred, the partially expanded forms of FIGS. 4 and 5 have also proved to be highly successful. These packing units, represented at 107 and 122 in FIGS. 4 and 5, are intermediate products derived, for example, from step 8 in the processing of FIG. 1.

Referring now to FIGS. 8 through 13, it will be seen that packing units of differing ratios of length to diameter may be produced. In general, the ratio of length to diameter of an individual packing unit will be determined by the speed of the cutter 74 with respect to the pulling speed of the unit 64. Thus a faster rate of rotation will produce shorter units having relatively smaller ratio of length to diameter (e.g., the packing units 138 shown in FIGS. 6 and 7). A slower cutter speed will produce units such as the units 150 in FIG. 8, which on processing through the successive expansion stages represented in FIGS. 9, 10 and 11, will have a substantially greater length to diameter ratio. The processing represented by these figures can be substantially identical to that just described, except for the length of the individual units. As will be understood, a mass of packing units produced by such processing must pass through the successive expansion stages represented at 150a, b and c in FIGS. 9 through 12.

It will be understood that reducing the pulling speed or ratio will reduce the length to diameter ratio of the units. It will also reduce the degree of longitudinal stretching of the cells 68 (see FIG. 3). As noted previously, it is generally desirable to employ pulling ratios of at least 5:1 and preferably 10:1.

FIG. 13 illustrates a further form of the packing units obtained by a still slower rate of rotation of the cutter blades 78 at the cutter 74. In other respects however, the packing units 160 are obtained by substantially identical processing to that previously described, being substantially identical in form to the packing units 138 and 150c in FIGS. 7 and 12, except for the greater length with respect to diameter. In general, the length of the individual units should be sufficient to provide a substantial cross-section or volume (represented at 162 in FIG. 6) to obtain the desired feature of crushability in the individual units. On the other hand, the ratio of the length of the units to diameter should not be so large as to impair the desired free-flow characteristic of the packing mass. In general, it has been found that particularly satisfactory materials have a ratio of length to diameter within the range from about 1:8 to 8:1.

The following specific example is illustrative of the processing described herein, and also illustrates the overall operation of the apparatus just described.

To initiate operations, an extrusion mass comprising a thermoplastic resin together with foaming and nucleating agents is continuously fed to the hopper 18 of the extrusion apparatus 20. The extrusion mass advantageously incorporates commercially available extrusion components, for example polystyrene beads of the type disclosed in U.S. Pat. 2,983,692, which preferably include foaming or expanding agents (i.e., pentane or Freon. Unless included within the polystyrene beads, 1.5 pounds of sodium bicarbonate together with 0.5 to 1.0 pound of sodium citrate is added to each 100 pounds of resin, together with a small amount of a suitable wetting agent (e.g., salad oil).

The extrusion mass is fed by gravity through the hopper 18 to the barrel 22 of the extrusion apparatus, where it is subjected to heating by the heating units 36, 38 and 40, maintained at 290°, 300° and 230° F., respectively, by the controller 48. In the event the extrusion barrel becomes overheated, the heating unit 40 is deactivated and the blower 34 activated to effect cooling, with cooling causing a reverse control operation, in a conventional cycling operation. Control is provided in a similar fashion at the extrusion head by means of the heating units 44 and 46 which are thermostatically controlled by the sensors 45 and 47. In a typical operation, the heater 46 is operated only during start-up, since the heat generated in the die by friction during operation is ordinarily sufficient.

Extrusion of the molten plastic feed through the circular orifice between the female and male die components 50, 52 causes a hollow expanded plastic tube 60 to be continuously formed. This tube is immediately pulled and stretched as it issues from the die orifice by the frictional engagement of the belts 62 of the pulling device with cooled, hardened portions of the extruded tube. For example, at an extrusion speed of 5 feet per minute, the pulling device 64 can be operated at a speed of 250 feet per minute to achieve a pulling ratio of 50:1. The resultant lengthening or stretching of the tube 60 as it is extruded, effects a desired longitudinal orientation and elongation of cells formed in the tube walls by the combined action of the foaming and nucleating agents incorporated into the extrusion mixture.

During its passage from the extruder head 42 to the pulling device, the tube 60 passes through an anti-static device 70 where it is coated with a thin film of an aqueous detergent solution. Evaporation of this film effects some atmospheric cooling of the tube, as it passes to the pulling device 64. From the pulling device the substantially cooled tube is fed into the bearing of the cutter 74, and passed into the space between the front and rear bearings 76. Cutting is accomplished by a relatively rapid rotation of the cutter flywheel 77 to bring the knife blades 78 into spaced contacts with the tube as it moves in supported fashion through the bearings 76.

The output of the operation just described, at the speed of the extruder screw of 40 r.p.m. is approximately 14 pounds of foamed expanded plastic per hour. The individual units have an outer diameter of 5/32 inch and an internal diameter of 1/16 inch (as compared to non-stretched outer diameter of 3/4 inch and internal diameter of 1/8 inch). At a speed of 225 r.p.m. a four-bladed cutter 74 operates to produce individual units of approximately 1 1/16 inch in length. The foam density of a mass of such product is about 1.5 pounds per cubic foot. It may be noted that a multiple headed extrusion die can be advantageously employed. In the case of double-headed extrusion die the extrusion screw will operate at approximately 80 r.p.m. with a capacity of about 20 to 25 pounds of foamed expanded plastic per hour. In like fashion a multiple orificed single-headed die might also be employed, with like consideration as to operation of the extrusion apparatus.

The individual unit from the cutter are passed onto the first of the conveyers 90 for continued cooling and aging, during which gas pressures and temperatures within the cells of the foamed expanded plastic are equalized with that of the ambient atmosphere. For such purpose, the severed units are held for approximately four hours in bins or on the belt conveyers, following which they are passed to the conveyor 102 of the first expansion unit 100 and subjected to the action of atmospheric steam at about 210° F. for a period of about 60 seconds. The product 108 issuing from the first expansion has an expanded diameter of approximately 1/4 inch, an expanded internal diameter of approximately 1/8 inch and a length within the range from 3/4 to 1 inch. The bulk density of a mass of product 108 from the first expansion unit is approximately one pound per cubic foot. The expanded units produced by the first stage expansion are continuously fed to storage bins or the holding conveyers 92 where they are subjected to aging or holding at atmospheric conditions for a minimum of four hours to permit the outside air to penetrate to the cells and to relieve the partial vacuum created by the cooling. The cooled and equalized units at 108 are fed to the second stage expansion unit 114 where they are subjected to atmospheric steam at about 210° F. for an additional 60 seconds. The expanded product 122 issuing from the second stage expansion has an approximate expanded diameter of about 3/8 inch, an internal expanded diameter of about 3/16 inch and a length of approximately 3/4 inch. The bulk density of the twice expanded product is about 0.6 pound per cubic foot. The twice expanded product is again subjected to cooling and aging on the conveyers 94 to achieve equalized conditions, following which the twice expanded product is fed to the third stage expander 130. The product issuing from the expansion unit 130 has an outside diameter of approximately 5/8 inch and an inside diameter on the order of 1/4 inch, and an average length of about 3/4 inch. The bulk density of the thrice expanded material is approximately 0.35 pound per cubic foot. This product can be packaged for shipment to the customer in polyethylene bags or other packaging 144.

It will be understood that many variations are possible in the procedure just described without departing from the scope of the invention. Specifically, the dimensions of the cooled extruded tube fed to the cutter and into the subsequent expansion stages will depend in large measure on the pulling ratio, a larger pulling ratio reducing the diameter and a smaller pulling ratio increasing the diameter. Additionally, while the described procedure for expansion (with intermediate holding or aging steps) is most satisfactory for production of a dimensionally stable product, the aging step may be eliminated in certain instances. It has been found for example, that elimination of the aging step between the second and third stage expansions effects an immediate shrinkage of the product issuing from the third stage expansion unit, to produce an essentially shriveled surface. The resultant irregular surface characteristics are useful in certain packaging applications where resistance to migration of the packed item is of paramount importance.

As a further variation the product in unexpanded or partially expanded form may be shipped to the consumer and, upon being subjected to expansion processing, immediately used in packing operations so that further expansion occurs within the packaging unit itself. Such expansion which has been observed to continue for up to 12 hours (and thereby to increase the volume of the packing material up to 20%) serves to immovably position the packed item within the shipping carton to thereby further add to the protection of the same.

As previously noted, many product variations are possible by varying the processing conditions, for example, by operating the cutter 74 at different speeds of rotation to produce products having different length to diameter ratios, as represented by the products shown in FIGS. 7, 12 and 13. These and other variations in the processing, and in the final product, are clearly within the skill of one versed in this art.

I claim:

1. In a method for the continuous manufacture of free-flow foamed expanded plastic packing materials of hollow cross-section, the continuous simultaneous and progressive steps of heating an expandable plastic material to form a heat-softened extrusion mass, said expandable plastic material being a polymer of a compound from the group consisting of the aliphatic olefin polymers and the alkenyl aromatic polymers comprising at least 70% by weight of an alkenyl aromatic compound having the general formula:

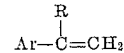

wherein Ar represents an aromatic hydrocarbon of the benzene series, and R is hydrogen or the methyl radical, extruding the heat-softened mass along an extrusion axis to form hollow heat-softened plastic units, simultaneously applying pulling forces to longitudinally stretch the extruded units to longitudinally orient gas cells in the walls thereof, said pulling forces being applied at lineal speeds at least 5 times the lineal speed of extrusion along said extrusion axis, cooling the stretched units to a set stage, continuously severing portions of the same to form individual hollow units of desired length, thereafter heating the severed units to expand the gas cells and surrounding plastic material primarily in a radial direction as respects the extrusion axes of the individual units, and cooling the expanded units to ambient temperature.

2. A method as in claim 1 wherein said pulling forces are applied at lineal speeds at least 10 times the lineal speed of extrusion along said extrusion axis.

3. A method as in claim 1 wherein said pulling forces are applied by frictionally engaging set portions of the extruded units to longitudinally stretch heat-softened, freshly extruded portions of the same.

4. A method as in claim 1 wherein said heating and expanding of the hollow units is carried out in successive stages with intermediate holding periods to allow equalization of internal gas pressures and temperatures within the gas cells with ambient pressure and temperature.

5. A method for the continuous manufacture of free-flow packing materials in the form of relatively stiff but crushable foamed expanded plastic units of hollow cross-section, comprising continuously feeding to an extrusion zone an extrusion mass composed of heat-softenable plastic material, said expandable plastic material being a polymer of a compound from the group consisting of the aliphatic olefin polymers and the alkenyl aromatic polymers comprising at least 70% by weight of an alkenyl aromatic compound having the general formula:

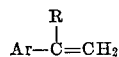

wherein Ar represents an aromatic hydrocarbon of the benzene series, and R is hydrogen or the methyl radical, continuously heating said extrusion mass and extruding the same in the form of a hollow heat-softened tube, said heat-softened tube being subject to cooling in ambient atmosphere to a set stage, continuously frictionally engaging set portions of the extruded tube to pull the same away from the extrusion zone to thereby longitudinally stretch and maintain the freshly extruded material in a desired hollow tubular configuration, said frictional engagement being applied at lineal speeds with respect to the lineal speed of extrusion sufficient to provide a pulling ratio of at least 5:1, the longitudinal stretching serving to longitudinally orient gas cells formed in the walls of the tube during the extruding, continuously cooling the extruded tube in ambient atmosphere to a set stage, and continuously cutting and severing portions of the cooled tube to form short tubular sections capable of being subsequently heat expanded for use as a free-flow packaging material.

6. A method as in claim 5 wherein said pulling forces are applied at lineal speeds at least 10 times the lineal speed of extrusion along said extrusion axis.

7. A method as in claim 5 including the further step of applying an anti-static agent in the form of an aqueous solution of detergent liquid to the surface of the freshly extruded tube, while still in a heat-softened condition, to thereby permanently bond the anti-static agent to the outer surfaces of said tube.

8. A method for the continuous manufacture of free-flow packing materials in the form of relatively stiff but crushable foamed expanded plastic units of hollow cross-section, comprising continuously feeding to an extrusion zone an extrusion mass composed of heat-softenable plastic material, said expandable plastic material being a polymer of a compound from the group consisting of the aliphatic olefin polymers and the alkenyl aromatic polymers comprising at 70% by weight of an alkenyl aromatic compound having the general formula:

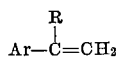

wherein Ar represents an aromatic hydrocarbon of the benzene series, and R is hydrogen or the methyl radical, continuously heating said extrusion mass and extruding the same in the form of a hollow heat-softened tube, said heat-softened tube being subject to cooling in ambient atmosphere to a set stage, continuously frictionally engaging set portions of the extruded tube to pull the same way from the extrusion zone to thereby longitudinally stretch and maintain the freshly extruded material in a desired hollow tubular configuration, said frictional engagement being applied at lineal speeds with respect to the lineal speed of extrusion sufficient to provide a pulling ratio of at least 5:1, the longitudinal stretching serving to longitudinally orient cells formed in the walls of the tube during the extruding, continuously cooling the extruded tube in ambient atmosphere to a set stage, continuously severing desired lengths of the extruded tube as relatively short hollow sections, thereafter heating the severed hollow sections to expand the longitudinally oriented cells to effect a substantial radial expansion of the severed sections and cooling the expanded hollow sections to the temperature of the ambient atmosphere.

9. A method as in claim 8 wherein said pulling forces are applied at lineal speeds at least 10 times the lineal speed of extrusion along said extrusion axis.

10. A method as in claim 8 wherein the extruded hollow sections are cooled at ambient temperature and pressure for a period of time sufficient to permit the gas temperatures and pressures within the cells of the hollow sections to equalize with the ambient temperature and pressure, following which the tubular sections are again heated to expand gases within said cells and void spaces to thereby further enlarge the radial dimensions of the tubular sections.

11. A method as in claim 9 wherein the said heat-softenable plastic material is fed to said extrusion zone together with an expanding agent selected from the group consisting of pentane, hexane, heptane, butane, nitrogen, argon, neon, helium, acetylene, ammonia, fluorochloromethanes, fluorochloroethanes, chloromethanes, chloroethanes, and carbon dioxide, and with nucleating agents selected from the group consisting of bicarbonate of soda together with sodium citrate, bicarbonates and organic acids, nitrogen liberating compounds together with finely divided solids.

12. A method for the continuous manufacture of free-flow packing materials in the form of relatively stiff but crushable foamed expanded plastic units of hollow cross-section, comprising continuously feeding to an extrusion zone an extrusion mass composed of thermoplastic resin, said expandable plastic material being a polymer of a compound from the group consisting of the aliphatic olefin ploymers and the alkenyl aromatic polymers comprising at least 70% by weight of an alkenyl aromatic compound having the general formula:

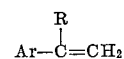

wherein Ar represents an aromatic hydrocarbon of the benzene series, and R is hydrogen or the methyl radical, continuously heating, extruding and expanding said extrusion mass to form a hollow heat-softened plastic tube, said heat-softened tube being subject to cooling in ambient atmosphere to a set stage, continuously frictionally engaging set portions of the expanded extruded tube to pull the same away from the extrusion zone and to substantially reduce the expanded diameter while longitudinally stretching gas pockets and void spaces in the walls of said extruded tube, said frictional engagement being applied at lineal speeds with respect to the lineal speed of extrusion sufficient to provide a pulling ratio of at least 5:1, continuously cooling the extruded tube in the ambient atmosphere to harden the same to a set stage, continuously severing portions of the cooled hardened extruded tube to provide a plurality of relatively short hollow sections, continuing the cooling while holding the severed sections in the ambient atmosphere for a period of time sufficient to permit equalization of gas pressures and temperatures within cells contained in the walls of the severed sections with that of the ambient atmosphere, heating said severed sections in the presence of atmospheric steam for a period of time sufficient to soften the wall structures of the tubular sections and to expand the equalized gases within said cells to stretch the walls of the tubular sections primarily in a radial direction, cooling the hollow severed sections by exposure to the ambient atmosphere while holding the severed sections in said atmosphere for a period of time to permit equalization of gas pressures and temperatures within the said expanded cells with that of the ambient atmosphere, heating the severed sections at least once again in the presence of atmospheric steam to again soften the cell wall structure and to expand the gases within said cells to again stretch the cells and cell walls contained within the severed sections primarily in a radial direction, and again cooling and holding the severed sections to equalize the gas pressures and temperatures within the cells with that of the ambient atmosphere.

13. A method as in claim 12 wherein said pulling forces are applied at lineal speeds at least 10 times the lineal speed of extrusion along said extrusion axis.

References Cited

UNITED STATES PATENTS

| | | | |
|---|---|---|---|
| 3,086,885 | 4/1968 | Jahn | 264—53 X |
| 3,188,264 | 6/1965 | Holden | 264—51 X |
| 3,251,728 | 5/1966 | Humbert | 264—51 X |
| 3,264,381 | 8/1966 | Stevens | 264—53 X |
| 3,387,067 | 6/1968 | McCurdy | 264—53 |
| 3,400,037 | 9/1968 | Sare | 264—53 X |
| 3,435,103 | 3/1969 | Medhurst | 264—53 |

JULIUS FROME, Primary Examiner

P. A. LEIPOLD, Assistant Examiner

U.S. Cl. X.R.

18—4 S, 12 F; 264—53, 55, 150, 210 R